United States Patent [19]

Bush et al.

[11] 4,199,168
[45] Apr. 22, 1980

[54] FIFTH WHEEL SUSPENSION

[75] Inventors: James H. Bush, Zeeland; Samuel A. Martin, Holland, both of Mich.

[73] Assignee: Holland Hitch Company, Holland, Mich.

[21] Appl. No.: 909,615

[22] Filed: May 26, 1978

[51] Int. Cl.² ............................................. B62D 53/08
[52] U.S. Cl. .................................................... 280/439
[58] Field of Search ................... 280/441, 438 R, 439, 280/440, 483, 484

[56] References Cited

U.S. PATENT DOCUMENTS

| 3,122,382 | 2/1964 | Carrier | 280/438 R |
| 3,309,111 | 3/1967 | Vaugoyeau | 280/438 R |

FOREIGN PATENT DOCUMENTS

436212  1/1970  Australia .................................. 280/440

*Primary Examiner*—John A. Pekar
*Attorney, Agent, or Firm*—Price, Heneveld, Huizenga and Cooper

[57] ABSTRACT

A support for a tilt stabilizing fifth wheel hitch that connects a truck tractor to a trailer, the fifth wheel plate being on a movable frame having a pair of convex shoes connected by a tie rod and resting on concave bearing plates on a fixed frame, the movable frame being movable on the fixed frame toward either of two opposite extreme positions from an intermediate neutral position. The movable frame is biased away from these extreme positions toward the intermediate position by variable force biasing means, preferably coil compression springs on said tie rod, which apply increasing biasing force with increased movement of the movable frame toward one of said extreme positions, thereby enabling the truck driver to "sense" or "feel" the tilted condition of his trailer relative to his tractor during operation.

2 Claims, 3 Drawing Figures

FIFTH WHEEL SUSPENSION

BACKGROUND OF THE INVENTION

This invention relates to connecting hitches for coupling a truck tractor to a trailer, and more particularly to a fifth wheel hitch support structure.

A fifth wheel hitch support that shifts laterally in an arc to stabilize a trailer during side tilt of the trailer is set forth in U.S. Pat. No. 3,122,382. The stability resulting from this structure has caused it to gain considerable acceptance. A subsequent version of the apparatus is also set forth in Australian Pat. No. 436,212 dated July 18, 1968, and New Zealand Pat. No. 153,126 dated July 15, 1968.

The function of these hitches is such that a movable frame can arcuately laterally shift on a stationary frame in response to trailer tilt or uneven terrain, to keep the trailer center of gravity directly over the tractor frame for stability. This movement is limited in either direction by stops, typically using rubber snubbers which provide some shock absorber effect at the very limits of movement. When the trailer moves beyond the uneven terrain, gravity forces operating through the trailer returns the fifth wheel plate.

Using such a hitch, it has been found that, as the trailer tilts varying amounts during this stabilizing action, the driver may actually be unaware of the tilting action or the extent thereof until the movable frame strikes the stop at the extreme shifted position. Ideally, the driver should be constantly aware when this stabilizing movement is occurring, and the extent to which it is occurring since, the more knowledge the driver has to the actions of his rig, the more confidence he has in his control of it. Specifically, ideally the driver should be provided with the facility to "feel" or "sense" the trailer tilt stabilizing movement, and the extent of movement occurring. This factor stimulated the efforts toward conceiving this present development.

Actually, the present development not only provided a benefit relating to this factor, but also provided a solution to another seemingly unrelated problem experienced during uncoupling and recoupling with this type of fifth wheel hitch. Specifically, when a tractor is detached from a trailer that is on uneven terrain, the fifth wheel can be in a laterally tilted condition such that, when the driver attempts to recouple the tilted fifth wheel to another trailer on different terrain, difficulty can be experienced because of the fifth wheel being cocked relative to the orientation of the kingpin on the second trailer. This can cause damage to the equipment or at least, extra effort by the driver to straighten up the fifth wheel plate.

SUMMARY OF THE INVENTION

The stabilizing fifth wheel hitch support of this development is provided with variable force biasing resistance against stabilizing tilt movement of the movable frame on the stationary frame toward either of the two opposite extreme positions from an intermediate position at which the hitch plate is parallel to the truck frame, with increasing bias occurring in response to increasing tilting movement. It has been found that such a structure provides the driver with a "feel" or "sense" of the nature of the stabilizing tilt movement occurring, thereby providing him confidence because of his knowledge of the operating condition of his ring.

In the preferred embodiment illustrated, a pair of compression coil springs are between the frames, on opposite sides of the longitudinal centerline of the hitch, preferably retained on the tie rod that connects the bearing shoes of the movable frame.

In addition to this important control factor, the improved hitch support moreover causes the fifth wheel hitch plate, when uncoupled from a trailer, to be leveled, i.e. placed generally parallel to the truck tractor frame, regardless of the previous stabilizing angle of the hitch prior to uncoupling. Thus, the fifth wheel plate is then properly oriented for recoupling to another kingpin on another trailer on different terrain.

These and other objects and features of the invention will be apparent upon studying the following detailed specification in conjunction with the drawings.

DESCRIPTION OF THE PREFERRED EMBODIMENT

Figure 1:
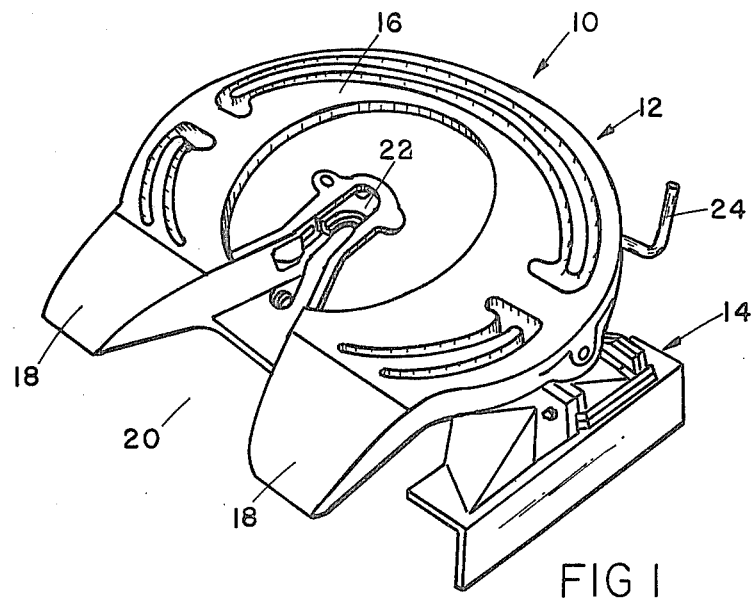
FIG. 1 is a perspective view of the hitch assembly.

The fifth wheel hitch assembly 10 includes a fifth wheel hitch plate subassembly 12 and a support subassembly 14, the latter including a fixed frame 38 and a movable frame 35.

The hitch plate preferably comprises a conventional bifurcated element opening to the rear, having an upper bearing slide surface 16 and a pair of slide projections 18 straddling a kingpin receiving slot 20. At the forward end of the slot is a conventional jaw structure 22 on pin 23 unlockable by a conventional handle mechanism 24. On the opposite sides of the fifth wheel plate, at the underside thereof, is a pair of dependent bearing sockets or trunions 26 receiving a pair of bearings 27 and bearing retaining sleeves 28, all connected by a pair of coaxially aligned pivot pins 30. The common axis of these bearings is basically horizontal, parallel to the truck frame, and perpendicular to the direction of travel of the fifth wheel on a truck tractor, such direction being aligned with the longitudinal fore to aft axis of slot 20 in conventional fashion.

Upstanding bearing sleeves 28 are mounted on the upper portions of a pair of cradles 32 to the underside of which is integrally secured a pair of arcuate bearing shoes 34. The bearing shoes have underside bearing surfaces which are arcuately laterally convex and spaced from each other on opposite sides of the structure, having like radii of curvature such that they are arcuate portions of an imaginary circle having a radius greater than the distance between the outer portions of the stationary or fixed frame 38 on which the movable frame 35 is supported. This is to retain the center of gravity of the trailer above the truck tractor frame as the trailer tilts sideways on uneven terrain.

The cradles 32 are interconnected by a tie rod 40, the central portion 40' of the rod being basically parallel to the underside frame structure of the fixed frame, and the two opposite ends 40" of the rod being at large obtuse angles to the center portion to be generally parallel to the bearing shoes 34 and normal to upstanding flanges 32' of the cradles 32. The ends of the rod extend through flanges 32'. Encircling the rod ends is a pair of generally cylindrical, resilient shock absorber snubbers 44 of rubber of the equivalent, preferably spaced from flanges 32' by a pair of respective washers 46 at the outer axial ends of the snubbers. At the inner axial ends of the snubbers is a pair of metal or equivalent annular plates 48.

The fixed frame 38 includes a pair of longitudinally extending (relative to the direction of travel of the truck tractor,) laterally spaced frame elements which have coplanar horizontal upper flanges 37 and integrally connected vertical flanges 36 for attachment to a truck tractor frame at opposite lateral sides thereof in a conventional manner. The fixed frame includes a pair of mounts 50 to the upper surface of which are secured a pair of bearing plates 52. The upper surfaces of these bearing plates are concavely arcuately curved to match the curvature of the lower bearing surfaces of elements 34, thereby allowing the upper movable frame to laterally rock on the lower fixed frame in a manner and for the reason explained in prior U.S. Pat. No. 3,122,382. The movable frame is retained on the fixed frame to prevent vertical displacement therebetween by suitable flange guides 39.

Figure 2:
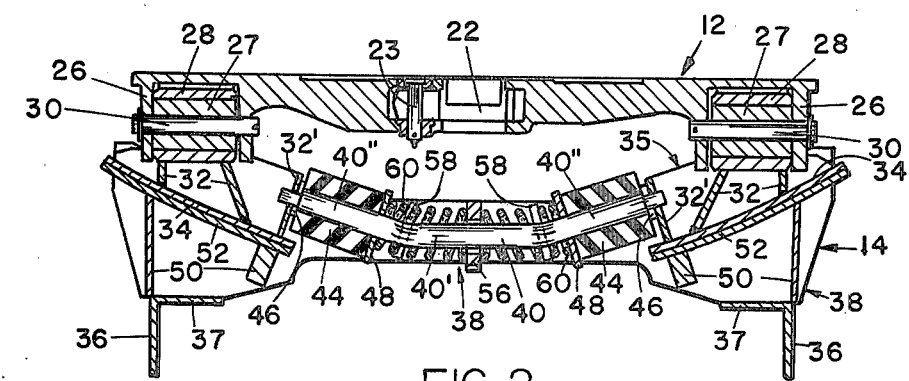
FIG. 2 is a transverse sectional elevational view of the hitch assembly.
Figure 3:
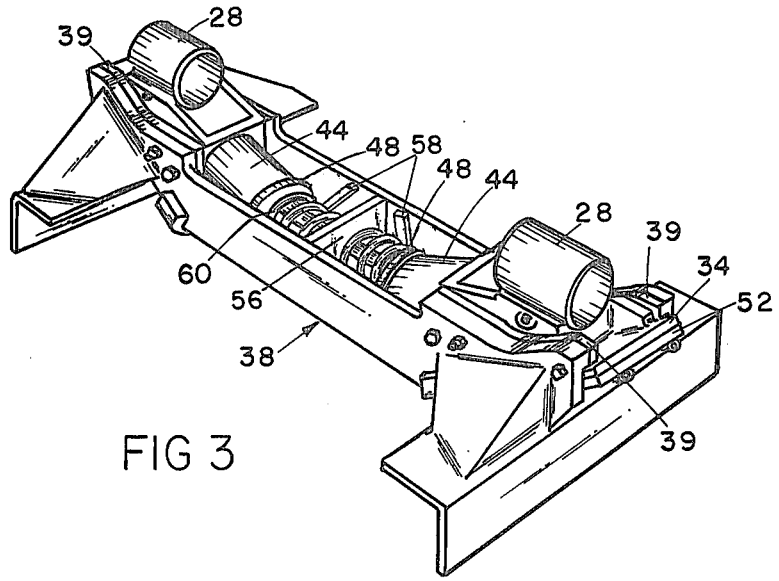
FIG. 3 is a perspective view of the support structure for the hitch, with the fifth wheel plate removed.

An upstanding center plate 56 is fixed between the walls of the fixed frame and is orificed to receive rod 40. Stop members 58 fixed to the walls of the fixed frame on each side of center plate 56 are oriented normal to the angular ends of the rod generally parallel to annular plates 48. Stop members 58 are adapted to abut annular plates 48 at the extreme position as will be hereinafter described. Captured between the annular plates 48 and center plate 56 is a respective pair of compression coil springs 60 extending around the ends of rod 40. These springs are selected to provide variable biasing force which biases the movable frame and the fifth wheel plate thereon toward the intermediate neutral position depicted in FIG. 2, i.e. biasing against movement of the movable frame in a rocking action toward either of the two extreme positions with lateral tilting action of the fifth wheel hitch plate relative to the fixed frame and the frame of the tractor. The coil springs individually provide an increasing biasing force as the movable frame moves increasing amounts away from the intermediate position toward one of the two opposite extreme positions with tilting of the movable frame and fifth wheel hitch plate. At either of the extreme positions, the respective coil spring is compressed to the maximum, with the rubber snubber at that spring abutting stop members 58 thus providing a shock absorbing effect as the extreme position is reached.

During operation of this hitch, assuming that the hitch is affixed to a truck tractor and a kingpin on the underside of a trailer is interconnected with the jaws 22 of the fifth wheel hitch, any movement of the trailer over laterally uneven terrain relative to the tractor will cause the trailer, fifth wheel hitch, and movable frame to tilt by rocking sliding movement between bearing shoes 34 and bearing plates 52. It has been found that the biasing force of the compression springs 60 enables the driver to sense or feel the nature of the stabilizing tilting movement of the trailer and hitch relative to the tractor to provide the driver with better knowledge of the condition of his rig during operation. This discovery is significant from a safety standpoint.

Moreover, another benefit accrues from the structure. When the fifth wheel hitch is disconnected from a kingpin of a laterally tilting trailer and the truck tractor is moved away from the trailer, coil springs 60 force the fifth wheel hitch plate to its intermediate neutral position rather than remaining in a cocked condition such that the driver can readily recouple to another trailer parked on differing terrain from the previous trailer. That is, the axis of bearings 30 will be basically parallel to the horizontal plane of the fixed frame 38 and to that of the truck tractor for easy alignment with the second kingpin. Of course, when the fifth wheel plate is uncoupled, the rear portions will drop with a pivot at bearings 28 in conventional fashion to give the plate a rear to aft upward slope for easier recoupling.

The following claims define the novel apparatus.

The embodiments of the invention in which an exclusive property or privilege is claimed are defined as follows.

1. In a hitch support for a trailer tilt stabilizing, tractor-trailer-connecting, fifth wheel plate, having in combination, an elongated stationary frame with arcuately concave bearing plates at opposite ends thereof, a movable frame with a pair of cradles forming a pair of convex shoes seated on said concave bearing plates, a tie rod between said cradles, a fifth wheel plate, pivotal bearings on said movable frame mounting said fifth wheel plate, said movable frame and fifth wheel plate being shiftable on said stationary frame from an intermediate position toward either of two opposite directions, and stop means between said movable frame and said stationary frame for limiting movement of said movable frame at predetermined extreme positions in either of said two opposite directions, the improvement comprising:

center plate means fixed to said stationary frame and extending generally vertically upwardly therefrom generally between said cradles; a variable force coil spring biasing means between each of said cradles and said center plate means for biasing said movable frame away from said predetermined extreme positions toward said intermediate position, said biasing means having the characteristic of applying increasing biasing force with increased movement of said movable frame toward one of said extreme positions, said center plate means including generally vertically oriented opposite surfaces against which said coil spring biasing means bear such that loads imposed by said coil springs tend to impose a lateral shifting force on said stationary frame whereby a tractor operator can sense the degree of compensating movement of said movable frame toward one of said extreme positions, and whereby said fifth wheel plate when not loaded will be biased to said intermediate position.

2. The combination of claim 1 wherein said coil spring elements are positioned around said tie rod said tie rod extending through an aperture in said center plate means.

* * * * *